United States Patent
Sevanto

(12) 
(10) Patent No.: US 6,747,989 B1
(45) Date of Patent: Jun. 8, 2004

(54) METHOD AND ARRANGEMENT FOR TRANSMITTING MULTIMEDIA-RELATED INFORMATION IN A PACKET-SWITCHED CELLULAR RADIO NETWORK WITH EXTERNAL CONNECTION

(75) Inventor: Jarkko Sevanto, Helsinki (FI)

(73) Assignee: Nokia Mobile Phones, Ltd., Espoo (FI)

(*) Notice: Subject to any disclaimer, the term of this patent is extended or adjusted under 35 U.S.C. 154(b) by 0 days.

(21) Appl. No.: 09/551,430

(22) Filed: Apr. 18, 2000

(30) Foreign Application Priority Data

Apr. 19, 1999 (FI) .................................. 990879

(51) Int. Cl.$^7$ .............................................. H04Q 7/22
(52) U.S. Cl. ...................................... 370/466; 370/469
(58) Field of Search ................................. 370/328, 338, 370/401, 466, 469, 310, 464, 465

(56) References Cited

U.S. PATENT DOCUMENTS

| | | | |
|---|---|---|---|
| 5,533,021 A | 7/1996 | Branstad et al. | 370/60.1 |
| 5,936,965 A | 8/1999 | Doshi et al. | 370/469 |
| 6,385,195 B2 * | 5/2002 | Sicher et al. | 370/356 |
| 6,600,732 B1 * | 7/2003 | Sevanto et al. | 370/349 |
| 6,608,832 B2 * | 8/2003 | Forslow | 370/353 |

FOREIGN PATENT DOCUMENTS

| WO | WO 99/61966 | 12/1999 |
|---|---|---|
| WO | WO 99/66746 | 12/1999 |

* cited by examiner

Primary Examiner—Chi Pham
Assistant Examiner—Derrick W. Ferris
(74) Attorney, Agent, or Firm—Perman & Green, LLP

(57) ABSTRACT

A method is provided for transmitting multimedia-related information between a terminal and a network device. A first protocol stack (201, 202, 203, 204, 205, 206, 207) is defined for the terminal and a second protocol stack (271, 272, 273, 274, 275) is defined for the network device. The protocol stacks consist of layers and serve the arranging of the mutual exchange of information between the terminal and the network device. A second network device intermediates the transmission of multimedia-related information. An octet stream protocol layer (206, 255) is defined for the transmission of unstructured octet streams as a certain layer in the terminal protocol stack and a certain layer in the second network device's protocol stack, and a network transmission protocol layer (264, 274) is defined for the transmission of data between the network devices. A multimedia messaging transport protocol layer (207, 275) is also defined as a certain layer above the octet stream protocol layer (206) in the terminal's protocol stack and the network transmission protocol layer (274) in the first network device. Multimedia-related information is exchanged between the multimedia messaging transport protocol layer (207) in the terminal and the multimedia messaging transport protocol layer (275) in the first network device through the use of the octet stream protocol layer (206, 255), the network transmission protocol layer (264, 274) as well as other lower layers in the protocol stacks.

5 Claims, 4 Drawing Sheets

METHOD AND ARRANGEMENT FOR TRANSMITTING MULTIMEDIA-RELATED INFORMATION IN A PACKET-SWITCHED CELLULAR RADIO NETWORK WITH EXTERNAL CONNECTION

TECHNOLOGICAL FIELD

The invention concerns generally the use of certain protocols and services for conveying certain types of information between the different nodes of a telecommunication network. Especially the invention concerns the transmission of multimedia-related information between a terminal of a cellular radio network and a store-and-forward type messaging center which has a network connection to at least one node computer of a fixed packet-switched network.

BACKGROUND OF THE INVENTION

Multimedia is generally understood as the synchronized presentation of audiovisual objects to a user. It is typical to multimedia-related information that it may contain elements of highly different nature, like text, still images, simple graphical elements, video and sound.

MMS or Multimedia Messaging Service is a proposed way for arranging the delivery of messages containing multimedia-related information from one telecommunication device to another. With "multimedia-related" information we mean both the actual payload data that represents presentable objects and the control information that tells a presentation device how to handle the payload data. According to the proposals, MMS should be applicable for conveying such messages to and from the terminals of packet-switched cellular radio networks such as GPRS (General Packet Radio Service) and the packet-switched parts of UMTS (Universal Mobile Telecommunication System) in a store-and-forward manner much like the SMS (Short Messaging Service) text messages are conveyed in the second generation digital cellular networks, e.g. GSM (Global System for Mobile telecommunications).

FIG. 1 illustrates some system aspects of a known proposal for arranging the transmission of MMS messages between two mobile terminals 101 and 102. In FIG. 1 each terminal is operating in a cellular telephone system of its own: terminal 101 is a UMTS terminal operating in a UMTS network 103 and terminal 102 is an enhanced GSM terminal operating in an enhanced GSM network 104. From both networks there is a connection to a GPRS network 105. The UMTS network 103 comprises a UTRAN or UMTS Terrestrial Radio Access Network 106 as well as a CN or Core Network 107. In the enhanced GSM network 104 a BSS or Base Station Subsystem 108 and an MSC or a Mobile Switching Centre 109 are shown. The detailed structure of the network elements is unessential to the present invention, but it is known that for example a UTRAN consists of a number of Radio Network Subsystems, each of which in turn comprises a Radio Network Controller and a number of Node Bs roughly corresponding to base stations. A BSS in turn comprises a Base Station Controller and a number of Base Transceiver Stations operating under it. Various mixed-mode cellular telephone systems are possible; for example the BSS 108 might operate under the same CN as the UTRAN 106. The terminals could also be exactly similar terminals operating close to each other in a single cell.

In FIG. 1 there is a connection both from the UTRAN 106 and from the BSS 108 to a corresponding SGSN or Serving GPRS Support Node 110 and 111. Both of these are in turn coupled, through the GPRS trunk lines, to a GGSN or Gateway GPRS Support Node 112 which also operates as an MMSC or a Multimedia Messaging Service Center. In analogy with the known SMS arrangements a terminal 101 may transmit an MMS message by identifying both the intended recipient's terminal 102 and the MMSC through which the message is to be transmitted (actually the latter may even be left out if there is a default MMSC for each terminal). A Packet Control Unit or a corresponding functionality in the UTRAN 106 takes the MMS transmission and routes it through the current SGSN 110 to the MMSC 112 which stores the MMS message and commences the attempts for delivering it to the intended recipient. If there is an existing connection to the recipient's terminal 102 the MMSC may deliver the message through the corresponding SGSN 111 and the BSS 108 to the terminal 102. If, however, the terminal 102 is temporarily shut off, out of coverage or otherwise unreachable, the MMSC retries the delivery at certain time intervals until either the message is successfully delivered or a timeout expires indicating that the message is obsolete and can be deleted undelivered. A positive or negative acknowledgement, depending on the success in delivery, may be returned to the transmitting terminal 101 if required.

A topic for discussion has been the most advantageous way of using the lower-level protocol layers and PDP Contexts (Packet Data Protocol) in the terminals and fixed network devices to convey the MMS messages. Somewhere at a relatively high level in the protocol stacks of both the terminals and the MMSC there must be an MMS-TP (Multimedia Messaging Service—Transport Protocol) entity that uses the services offered by the lower level protocols to convey an MMS message first from the transmitting device to the MMSC and then further to the receiving device. Additionally the MMS messages must be mapped into PDP Contexts of certain type; the mapping will be closely related to the choice of lower protocol layers under the MMS-TP entity. We anticipate that network operators will require the MMS messaging to be distinguishable from other forms of packet-switched data transmission in order to arrange for a suitable charging scheme for the MMS services.

At least three prior art solutions have been proposed for conveying MMS messages. One of them is to have a PDP Type separately defined for MMS, and to set up a PDP Context of that type between a terminal and an MMSC each time an MMS message has to be conveyed in either direction. This approach has the drawback of requiring a considerable amount of completely new specification and standardization work. Additionally new PDP Types are only very reluctantly accepted to the already frozen standards. A second proposed prior art approach is to build the MMS messaging on top of the known IP or Internet Protocol PDP Type. The latter approach would require the GGSNs to reserve and allocate dynamic IP addresses to mobile users. The use of dynamic addresses is not efficiently combined to MMS services, and in any case using the IP PDP Type for MMS messaging would consume the scarce IP addresses and involve the whole complexity of allocating and maintaining IP addresses and dynamically configuring hosts. A terminal roaming in another network should in practice always use the MMSC of its home network, because there is no possibility of dynamically telling the IP addresses of other MMSCs to the terminal.

A third approach has been proposed in the Finnish patent application no. 990586 of the same applicant, which application is not available to the public at the time of filing this application. The third approach is based on the use of the OSP or Octet Stream Protocol as the supporting lower-level service for the multimedia-related information. The advantages of OSP comprise limited overhead information, avoidance of dynamic IP address allocation, minimal need for revision to existing specifications and flexible addition of future enhancements. However, it has been found out that even the use of OSP does not solve all problems related to the arrangement of FIG. 1: the implementation of the integrated GGSN/MMSC entity is quite complex, and the multimedia messaging service must be directly controlled by the operator responsible for the operation and maintenance of the fixed packet-switched network.

SUMMARY OF THE INVENTION

It is an object of the present invention to provide a feasible method and a corresponding arrangement for conveying MMS messages between terminals and MMSCs. It is an additional object of the invention that the proposed method does not require exhaustive respecification in the framework of existing standards and proposals. A further object of the invention is to minimize the required protocol overhead in the MMS traffic between the terminals and the MMSCs. An even further object of the invention is to provide means for distinguishing the MMS traffic from other types of packet-switched information transfer. Additionally it is an object of the invention that the drawbacks of the above-explained OSP solution are avoided.

The objects of the invention are met by using the OSP or Octet Stream Protocol, known as such, to carry a data stream comprising the required multimedia-related information, implementing the multimedia messaging center separately from the node computers of the fixed packet-switched network and coupling it to such a node computer through a network connection.

The method according to the invention is characterized in that it comprises the steps of

- defining an octet stream protocol layer for the transmission of unstructured octet streams as a certain layer in a first protocol stack and a certain layer in a third protocol stack,
- defining a network transmission protocol layer for the transmission of data between a first network device arrangement and a second network device arrangement,
- defining a multimedia messaging transport protocol layer as a certain layer above said octet stream protocol layer in the first protocol stack and above said network transmission protocol layer in the second protocol stack and
- exchanging multimedia-related information between the multimedia messaging transport protocol layer in a terminal arrangement and the multimedia messaging transport protocol layer in a first network device arrangement through the use of the octet stream protocol layer as well as other lower layers in the first and third protocol stacks and through the use of said network transmission protocol layer as well as other lower layers in the second and third protocol stacks.

Additionally the invention applies to a network device which is characterized in that its control block is arranged to

- implement a network transmission protocol layer in a protocol stack for arranging the mutual exchange of information between network device and another network device,
- implement an octet stream protocol layer in said protocol stack for the transmission of unstructured octet streams between the first network device arrangement and a terminal arrangement,
- convert multimedia-related information coming from the other network device arrangement through said network transmission protocol layer into a format to be transmitted to the terminal arrangement through said octet stream protocol layer and
- convert multimedia-related information coming from the terminal arrangement through said octet stream protocol layer into a format to be transmitted to the other network device arrangement through said network transmission protocol layer.

The invention resembles the above-explained third solution in that the Octet Stream Protocol or OSP is used. However, instead of placing the MMS-TP protocol entity directly on top of the OSP entity in a GGSN, a conversion between OSP and some general network protocol is set up in the GGSN and said general network protocol is used to couple the GGSN to the MMSC, which may even very distantly located.

A PDP Context activation procedure between a terminal and a MMSC is required to enable the transmission of MMS messages in the framework of OSP. The device that initiates the activation procedure transmits an Activate PDP Context Request that contains a set of parameters that are required to identify and define the desired PDP Context. In the case of terminal-initiated PDP Context activation the SGSN may need to select the appropriate GGSN on the basis of the parameters contained within the activation request and possibly using also previously stored information about the home location of the terminal. On the basis of the information contained within the activation request the GGSN directs it further to a MMSC functionality. A multitude of network elements like routers, firewalls and so on may take part in the transmission of messages between the GGSN and the MMSC.

After the PDP Context setup has been accomplished, MMS messages are conveyed as an octet stream by using either the octet mode, where the OSP protocol entity applies a packet assembly/disassembly function, or the block mode where no separate packet assembling or disassembling is performed.

The invention has all the advantageous features of using OSP as the bearer for MMS, like minimized protocol overheads, complete separation of the MMS-related PDP Context from all other PDP Contexts even without defining a new PDP Type and avoidance of dynamic allocation of IP addresses. Additionally the invention simplifies the structure and operation of the MMSC compared to the integrated GGSN/MMSC solution and enables complete independency of the MMSC from the GPRS or other fixed packet-switched network.

The utilization of an unstructured octet stream between a terminal and a GGSN as well as a network connection between the GGSN and a MMSC enables the operators to direct the MMS-carrying PDP Contexts of desired users very freely; for example the MMSC residing in the user's home network can be used. On the other hand, operators may also allow any MMSCs to be used, but this may restrict the service to the mobile-originated alternative only. In any case the control possibilities are much more flexible than in the IP-based prior art solutions. A terminal may even select a desired MMSC by using a certain predefined parameter in an Activate PDP Context Request.

BRIEF DESCRIPTION OF DRAWINGS

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

FIG. 1 has been already discussed above within the description of prior art.

DETAILED DESCRIPTION OF THE INVENTION

Figure 1:
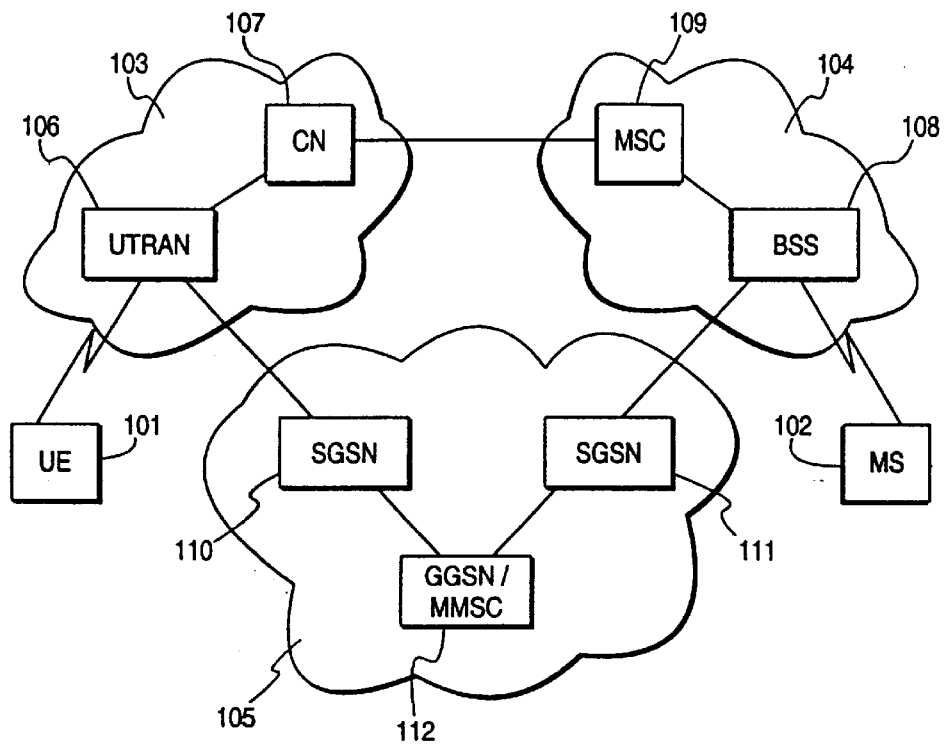
FIG. 1 illustrates some known system aspects of packet-switched data transmission.
Figure 2:
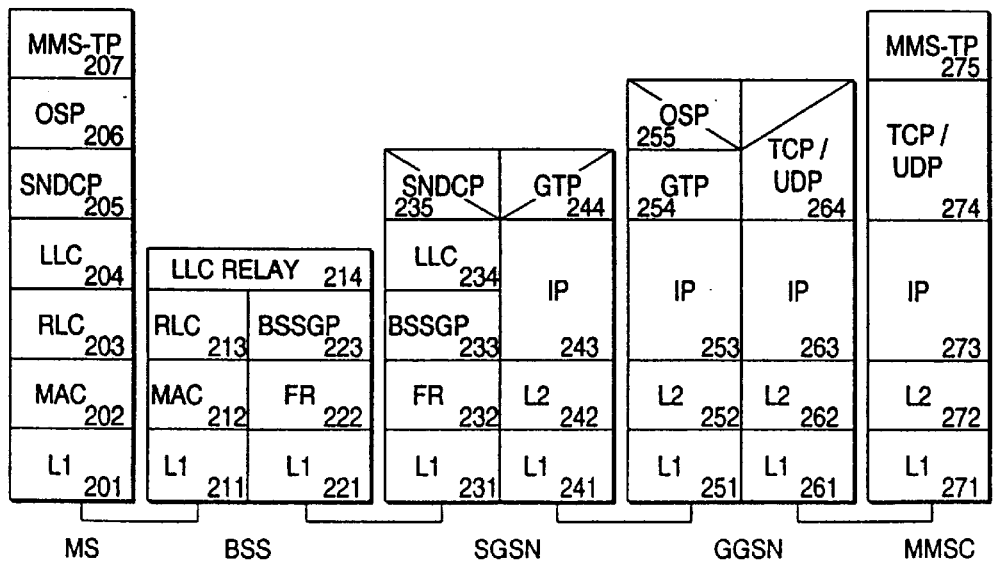
FIG. 2 illustrates an arrangement of protocol stacks according to the invention.

FIG. 2 illustrates an advantageous arrangement of protocol stacks in a terminal or Mobile Station (MS), an Base Station Subsystem (BSS), a Serving GPRS Support Node (SGSN), a Gateway GPRS Support Node (GGSN) and a Multimedia Messaging Service Center (MMSC). The notation refers to the application of the invention in association with an enhanced GSM network; this should not be construed as an implicit limitation to the applicability of the invention. In the context of UMTS, for example, the terminal would be designated as the UE (User Equipment) and the BSS would be substituted by one of the network devices belonging to a UTRAN, e.g. a Node B or a Radio Network Controller. Within the BSS or the UTRAN there may be a specific interface unit that takes care of all data traffic to and from such packet data networks that do not share the switching facilities (the core networks) with the cellular telephone systems.

The protocol layers related to the application of the invention in the MS are, from bottom to top, Layer 1 201, Medium Access Control 202, Radio Link Control 203, Logical Link Control 204, Subnetwork Dependent Convergence Protocol 205, Octet Stream Protocol 206 and Multimedia Messaging Service—Transport Protocol 207. Some sources refer to some of these layers as sublayers, which has no practical importance to the present invention. It has to be noted that the "MS" is a general notation for the apparatus or arrangement of apparatuses which are operative at a terminal end: one possible "MS" arrangement is a mobile telephone or other cellular network terminal coupled to a laptop computer, whereby for example the OSP protocol layer 206 may reside in the mobile telephone and the MMS-TP protocol layer 207 may reside in the laptop computer.

On the left-hand side of the BSS the three lowest layers 211, 212 and 213 are the same and on top of them there is LLC Relay layer 214 for performing the required conversions between the left-hand and right-hand sides of the BSS. The three right-hand layers of the BSS are, from bottom to top, Layer 1 221, Frame Relay layer 222 and BSS GPRS Protocol layer 223. In the SGSN the three lowest left-hand side layers 231, 232 and 233 are same as on the right-hand side of the BSS, and above them is the Logical Link Control layer 234 which is the peer entity of the similarly named layer in the MS. On the right-hand side of the SGSN there are the Layer 1 241, Layer 2 242 and Internet Protocol 243 layers. On top of the SGSN protocol stack there is a conversion entity consisting of an SNDCP half 235 and a GPRS Tunneling Protocol half 244.

The protocol layers on the left-hand side of the GGSN are, from bottom to top, Layer 1 251, Layer 2 252, Internet Protocol 253, GPRS Tunneling Protocol 254 and Octet Stream Protocol 255. On the right-hand side of the GGSN are the Layer 1 261 Layer 2 262 and Internet Protocol 263 layers as well as the Traffic Control Protocol/User Datagram Protocol layer 264, which in the layer hierarchy corresponds to the combined GTP and OSP layers on the left-hand side. There is a two-way OSP—TCP/UDP conversion, known as such, implemented between the left-hand side and the right-hand side of the GGSN. The protocol layers of the MMSC are, from bottom to top, Layer 1 271, Layer 2 272, Internet Protocol 273, Traffic Control Protocol/User Datagram Protocol 274 and Multimedia Messaging Service—Transport Protocol 275.

Figure 3:
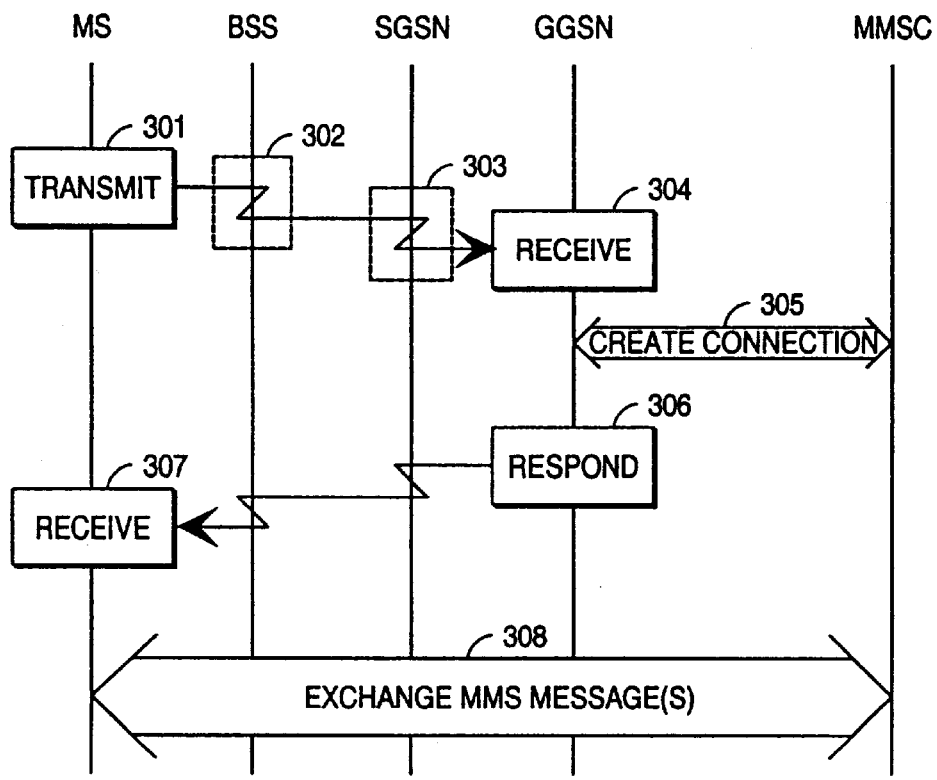
FIG. 3 is a schematic illustration of a method according to the invention.
Figure 4:
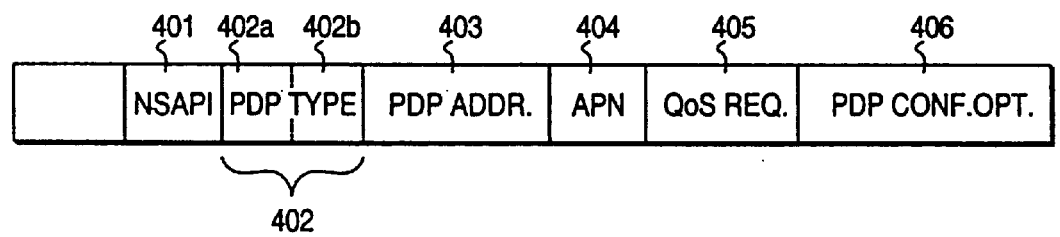
FIG. 4 is a schematic illustration of an Activate PDP Context Request used in association with the invention.

The use of the above-mentioned protocol layers in context of the present invention is explained in more detail in the following, with reference also to FIGS. 3 and 4. As an example we will use a mobile-originated procedure for enabling the exchange of MMS messages between a MS and a MMSC. At step 301 the MS transmits an Activate PDP Context Request message in a way basically known as such. In order to use said message to set up a PDP Context suitable for MMS transmission using the OSP, the MS needs to incorporate a certain set of parameters in the message. These parameters are schematically illustrated in FIG. 4 and they have the following meaning:

The Network Service Access Point Identifier or NSAPI 401 is selected by the MS. NSAPI identifies the PDP context to be activated within the GPRS/UMTS network. For identifying the user the message comprises also the TLLI (Temporary Logical Link Identity) and IMSI (International Mobile Subscriber Identity) information elements (not shown in FIG. 4).

The PDP Type 402 shall have a two-part value. The first part 402a shall identify the protocol as OSP, and the second part 402b shall identify the service being used and thereby allow the SGSN to select a GGSN that can provide the service. The two-part value of the PDP Type field can be expressed as OSP:MMS. This is a new OSP type that does not exist in the standards at the priority date of this patent application but is introduced in the previous Finnish patent application no. 990586 mentioned above.

The PDP Address field 403 is most advantageously empty.

The Access Point Name or APN 404 is selected by the MS. The selected APN identifies the GGSN which the MS wants to use for this context. The actual APN to be used (i.e. GGSN to be used) can be restricted by the operator by subscription. If that is the case, the HLR (Home Location Register) record of each user for multimedia messaging context includes the APN that is always used for MMS contexts. The MS may omit the APN from the Activate PDP Context Request message if the APN is configured in the HLR. Otherwise the user may include an APN in the message. If there is no APN in the message and no APN is configured in the HLR, the SGSN is free to choose any GGSN for multimedia messaging context (If Dynamic Allocation in the visited network is allowed by the HLR record).

The QoS Requested 405 (where QoS comes from Quality of Service) is selected by the MS. The requested service quality comprises a number of factors and their selection typically depends on the desired characteristics of the MMS-TP. Of the known reliability classes, class 2 is seen as the most advantageous, meaning RLC&LLC retransmissions as well as the use of UDP (User Datagram Protocol) at the GPRS backbone network. Bit rates can be negotiated to be anything without the invention limiting their negotiation. MMS message transmission is in general timeinsensitive, so delay class should reflect that; long delays are allowed. Service precedence is most advantageously high if it indicates dropping precedence which results in few packet losses.

The PDP Configuration Options field 406 should contain at least the Internet hostname (or IP-address) of the MMSC, the TCP or UDP port number the MMSC is listening to, and the type of protocol (TCP or UDP) being used between the GGSN and the MMSC. Based on this information the GGSN is able to set up an IP-based communication path to the MMSC. This communication path is then used for delivering the packets carrying multimedia-related information between GGSN and MMSC. However, the GGSN does not need to understand the structure or contents of these packets. Instead, the GGSN simply relays data received from the OSP layer to this IP-based communication path, and vice versa. The PDP Configuration Options field 406 can also be used e.g. for informing the MMSC about certain capabilities of the MS, such as supported content-types etc. MS-MMSC configuration information can be included in this information element if these are not implemented into the MMS-TP protocol itself. If there are many choices for the MMS-TP protocol (either totally separate protocols or different versions of the same protocol), the PDP Configuration options can be used for informing the MMSC which protocol(s) the MS supports on top of OSP.

At step 302 the BSS recognizes the Activate PDP Context Request message as concerning packet-switched services and consequently routes it to the current SGSN in a known way. At step 303 the SGSN selects the GGSN based on the HLR records and/or the MS-provided APN string. At step 304 the GGSN receives the message and recognizes from the context type that the new context is for MMS. The GGSN selects an external MMSC element based on the APN and/or the PDP Configuration Options field in the context activation request at step 305. The GGSN creates an association with the service attributes and the established tunnel (identified by TID consisting of the user's IMSI and the NSAPI value of the PDP context). The extension of this tunnel is the network connection (which itself is also a tunnel) to the MMSC.

After the service has been activated and possibly some MMS-related parameters have been configured (e.g. according to the information delivered in the Protocol Configuration Options information element), the GGSN sends at step 306 a PDP Context Activation Response message via the SGSN to the MS. The reception 307 of this message at the MS finalizes the context activation. No PDP address need to be assigned for the context, although such an assignment is not precluded by the invention. After that, there is a logical tunnel in place between the MS and the MMSC, where MMS-TP protocol messages can be delivered transparently as illustrated by block 308.

The activation of the PDP Context for transmitting MMS messages may also take place upon the initiative of the MMSC, for example in such a case where an MMS message has been stored for delivery to an MS which currently does not have an active PDP Context with the MMSC. According to the adopted practice within GPRS, the MS is always the one to transmit the initial Activate PDP Context Request message, but it is possible for the MMSC to indicate to the MS through a simple signaling message that there is a stored MMS message waiting for delivery, so that it is left to the MS's discretion to choose the moment for activating the PDP Context by commencing the procedures illustrated in FIG. 3. In other network arrangements an MMSC-originating PDP Context activation (though probably with different designations of the participating devices and associated messages) could be nearly identical to the MS-originating one described above. The identification information in the activation request would then serve to identify a particular MS instead of a SGSN-GGSN-MMSC combination, whereby the routing of the message could involve the known inquiries to the location registers which store the current location information of the MS.

There exists even a possibility of allocating a fixed NSAPI to identify a PDP Context of the OSP:MMS type, whereby an explicit PDP Context activation between the MS and the GGSN could be completely avoided. In such a case the occurrence of said fixed NSAPI in a packet would immediately indicate to all the devices taking part in the communication that the packet carries multimedia-related information, so especially the BSS and the SGSN could arrange its routing accordingly. The IMSI and the NSAPI together, as well as with possible other identification information of the packet, serve to identify the MS to which such a packet belongs. A specific APN entry would probably be required in each user's HLR records so that a SGSN would find the correct GGSN for each user.

Figure 5:
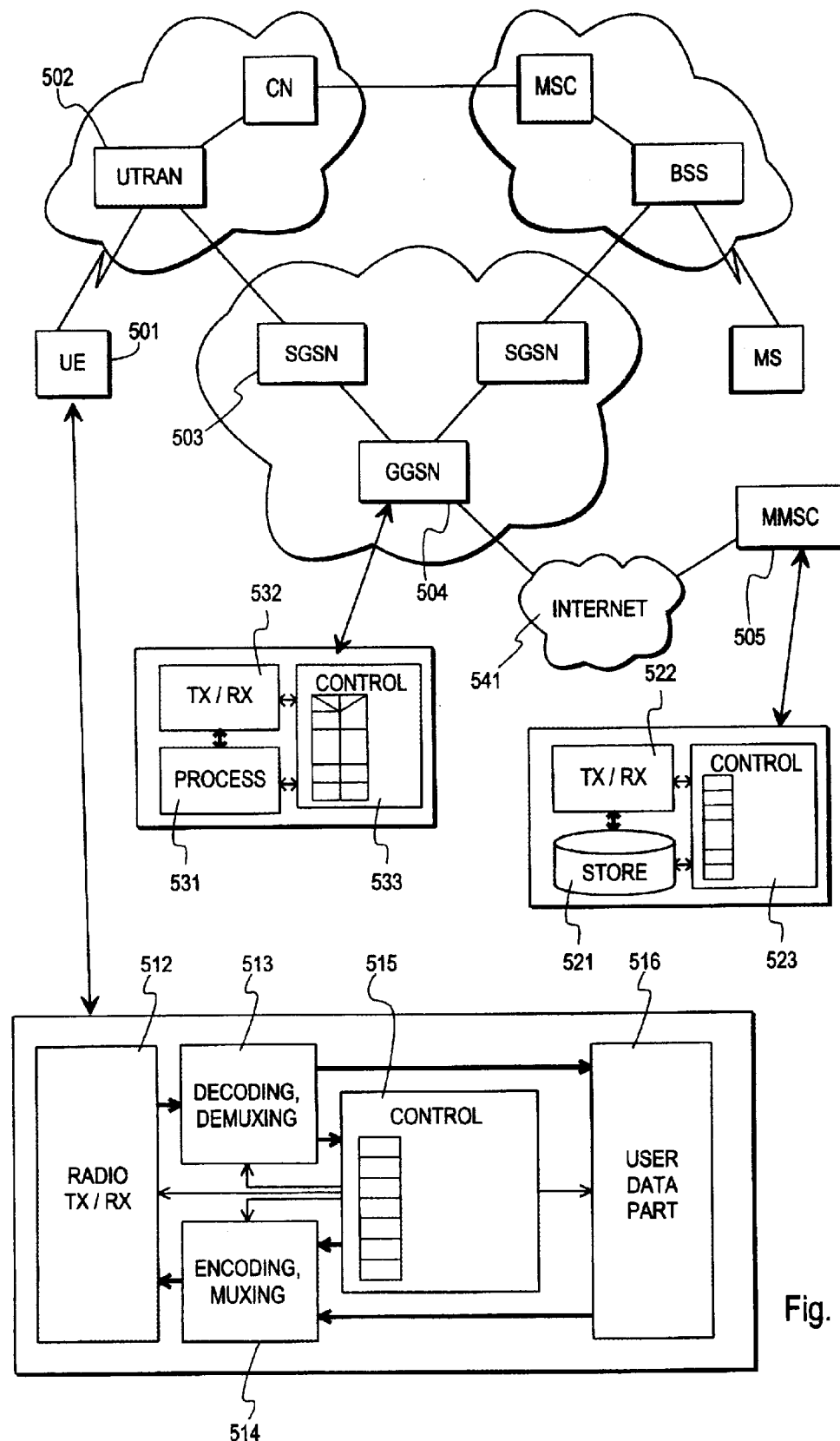
FIG. 5 illustrates schematically an arrangement according to the invention and FIG. 6 summarizes some aspects of certain protocol layers according to the invention.

FIG. 5 illustrates an arrangement according to the invention comprising a terminal or MS (or UE) 501, a BSS or UTRAN 502, a SGSN 503, a GGSN 504 and an MMSC 505. The hardware of the terminal comprises a radio transceiver block 512, a decoding/demultiplexing block 513, an encoding/multiplexing block 514, a control block 515 and a user data part 516. The decoding/demultiplexing block 513 is arranged to separate received signaling information from received user data and to direct the former into the control block 515; similarly the encoding/multiplexing block 514 is arranged to take signaling information from the control block 515 and to multiplex it for transmission with user data coming from the user data part 516. All other blocks operate under the supervision of the control block. The control connections are shown with thinner lines than the user data and signaling information connections. The MS protocol stack seen in greater detail in FIG. 2 is implemented within the control block 515 by programming the corresponding operations into a memory in the form of machine-readable processing instructions. If die terminal arrangement comprises a number of separate functional entities, the control block may be understood to consist of the control functions distributed into the physical controlling entities of the separate devices.

The MMSC is basically a large-capacity data storage 521 with a transmission unit 522 arranged to couple it to the Internet 541 (or a corresponding packet data network) as well as a control unit 523 to control the setting up, maintaining and tearing down of connections. The MMSC protocol stack seen in greater detail in FIG. 2 is implemented within the control block 523 by programming the corresponding operations into a memory in the form of machine-readable processing instructions.

The GGSN 504 is basically like any network-coupled computer device with a processing unit 531 and a transmission unit 532 arranged to couple the processing unit to the trunk lines of the GPRS network (or a corresponding packet data network) and the Internet 541. It may also comprise a control unit 533 to control the setting up, maintaining and tearing down of connections, although the control functions may be implemented as a part of the processing unit 531. The GGSN protocol stack seen in greater detail in FIG. 2 is implemented within the control block 533 by programming the corresponding operations into a memory in the form of machine-readable processing instructions.

Figure 6:
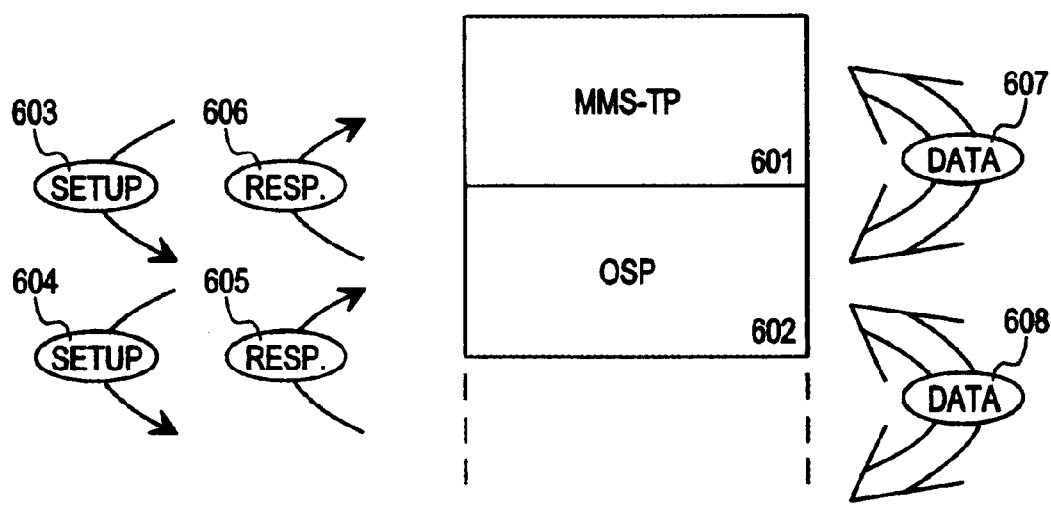

FIG. 6 summarizes the functions of the MMS-TP, OSP and lower protocol layers in all such protocol stacks where the MMS-TP and OSP layers are located. Between the GGSN and the MMSC similar functions take place through the intermediating lower layers associated with the network connection between the devices. The MMS-TP protocol layer 601 is arranged to indicate to the OSP layer 602 the need for setting up a OSP:MMS type PDP Context with a first primitive 603; this primitive should contain at least the APN, QoS Requested and PDP Configuration Options information elements referred to above. The OSP layer 602 is in general capable of indicating to the lower layers the need for setting up PDP Contexts, and especially capable of indicating with a setup request primitive 604 that a PDP Context of the OSP:MMS type should be requested. This second primitive 604 should contain at least the PDP Type, APN, QoS Requested and PDP Configuration Options information elements referred to above. The lower layers are in general capable of informing die OPS layer 602 about the completed activation of the PDP Context with a third primitive 605, and the OPS layer 602 is in turn capable of forwarding the same information to the MMS-TP layer 601 in a fourth primitive 606.

During operation the MMS-TP layer 601 is arranged to exchange user data with the OSP layer according to the arrow 607, and the OSP layer is arranged to transmit the user data to be transmitted further down in the protocol stack according to arrow 608 either in the octet mode or in the block mode. The former refers to the known use of a PAD or Packet Assembly/Disassembly function to assemble/disassemble a number of octets into/from a single packet for more effective transport by the underlying protocols. The block mode refers to the bypassing of the PAD function, whereby the MMS-TP layer 601 provides the message data to the OSP layer 602 in blocks of octets, and each block of octets is delivered as a single OSP PDU (Protocol Data Unit) to the underlying layers. The block mode is regarded as more advantageous for use in association with the invention, because each MMS message could be handled as an independent block of octets between the MMS-TP layer 601 and the OSP layer 602.

Tearing down of the OSP:MMS type PDP Context follows the known procedures of tearing down PDP Contexts.

What is claimed is:

1. A method for transmitting multimedia-related information between a terminal arrangement and a first network device arrangement, comprising the steps of:

defining a first protocol stack for the terminal arrangement and a second protocol stack for the first network device arrangement, the protocol stacks consisting of layers, for arranging the mutual exchange of information between the terminal arrangement and the network device arrangement, defining a third protocol stack for a second network device arrangement, the protocol stack consisting of layers, for using the second network device arrangement as an intermediate device taking part in the mutual exchange of information between the terminal arrangement and the first network device arrangement, defining an octet stream protocol layer for the transmission of unstructured octet streams as a certain layer in the first protocol stack and a certain layer in the third protocol stack, defining a network transmission protocol layer for the transmission of data between the first network device arrangement and the second network device arrangement, defining a multimedia messaging transport protocol layer as a certain layer above said octet stream protocol layer in the first protocol stack and above said network transmission protocol layer in the second protocol stack and exchanging multimedia-related information between the multimedia messaging transport protocol layer in the terminal arrangement and the multimedia messaging transport protocol layer in the first network device arrangement through the use of the octet stream protocol layer as well as other lower layers in the first and third protocol stacks and through the use of said network transmission protocol layer as well as other lower layers in the second and third protocol stacks.

2. A method according to claim 1, comprising the step of defining a default PDP Context between the terminal arrangement and the second network device arrangement for the exchange of multimedia-related information, said default PDP Context being of a specific type defined for the exchange of multimedia-related information and existing without explicit PDP Context activation.

3. A method according to claim 1, comprising the step of activating a PDP Context between the terminal arrangement and the second network device arrangement for the exchange of multimedia-related information, said PDP Context being of a specific type defined for the exchange of multimedia-related information.

4. A method according to claim 3, wherein the activation of the PDP Context involves the transmission of an Activate PDP Context message comprising a Network Service Access Point Identifier for identifying the PDP context to be activated, a PDP Type value for identifying the protocol as an octet stream protocol and for identifying the service being used as the transmission of multimedia-related information, an Access Point Name for identifying the second network device arrangement as the intended recipient device of the Activate PDP Context message, a QoS Requested field for indicating the requested quality of service for the PDP context to be activated and a PDP Configuration Options field for identifying the first network device arrangement as the intended peer in the transmission of multimedia-related information as well as for carrying other information related to the PDP context to be activated.

5. A first network device arrangement for exchanging multimedia-related information with a terminal arrangement and a second network device arrangement, said first network device comprising a control entity which is arranged to implement a protocol stack, implement a network transmission protocol layer in the protocol stack for arranging the mutual exchange of information between the first network device arrangement and the second network device, implement an octet stream protocol layer for the transmission of unstructured octet streams between the first network device arrangement and the terminal arrangement, convert multimedia-related information coming from the second network device arrangement through said network transmission protocol layer into a format to be transmitted to the terminal arrangement through said octet stream protocol layer and convert multimedia-related information coming from the terminal arrangement through said octet stream protocol layer into a format to be transmitted to the second network device arrangement through said network transmission protocol layer.

\* \* \* \* \*